Feb. 8, 1927. A. PIHL Re. 16,747

TELEPHONE RECEIVER

Original Filed Oct. 25, 1922 2 Sheets-Sheet 1

INVENTOR
Albert Pihl.

BY
Albert Dulmich
ATTORNEY

Feb. 8, 1927. Re. 16,547
A. PIHL
TELEPHONE RECEIVER
Original Filed Oct. 25, 1922 2 Sheets-Sheet 2
Fig. 5.
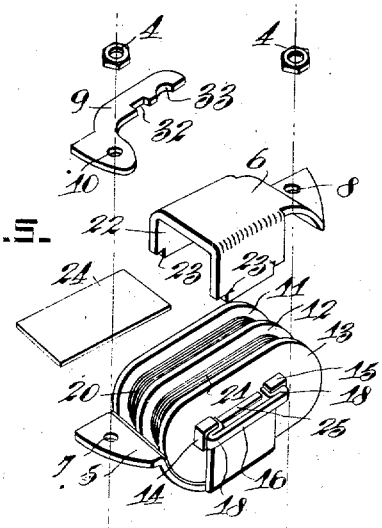
Fig. 6.
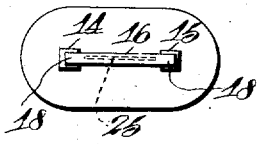
Fig. 7.
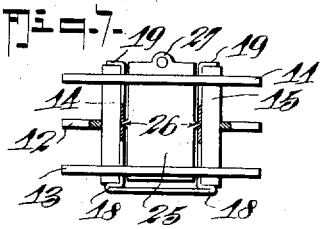
Fig. 8.
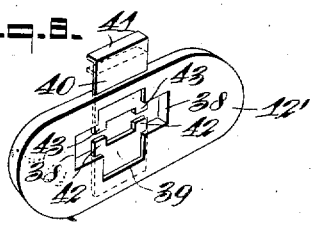
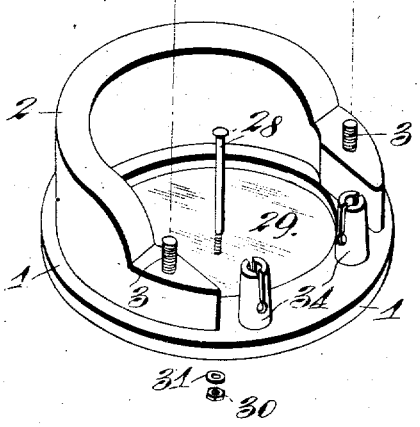
Fig. 9.
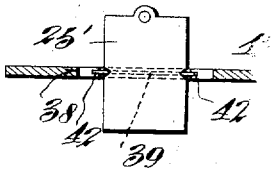
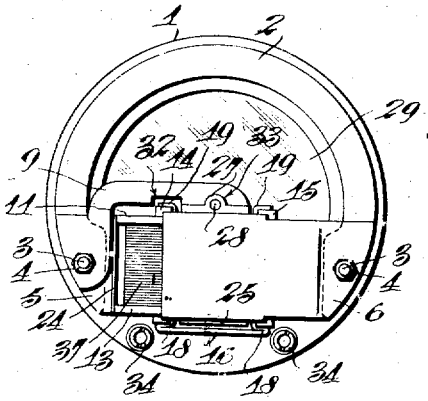
Fig. 10.
INVENTOR
Albert Pihl.
BY
Albert E. Dielmann
ATTORNEY Reissued Feb. 8, 1927.

Re. 16,547

UNITED STATES PATENT OFFICE.

ALBERT PIHL, OF MURRAY, UTAH, ASSIGNOR TO HOLLIDAY RADIO & MANUFACTURING COMPANY, A CORPORATION OF UTAH.

TELEPHONE RECEIVER.

Original No. 1,563,787, dated December 1, 1925. Serial No. 596,729, filed October 25, 1922. Application for reissue filed September 7, 1926. Serial No. 134,092.

My invention relates to an improved telephone receiver adapted for general use but particularly for wireless telephony. It is preferably of what is known as the watch case type and is very simple and compact in structure.

One object of the invention is to provide a novel means for mounting the armature so that it will be very sensitive and require slight current to operate.

Another object is to provide a simple compact arrangement of pole pieces and coils which will be very efficient.

Other objects will be apparent from the following detailed description and appended claims.

In the drawings:

Figure 5 is a view of the main parts of the receiver disassembled.

Figure 6 is an end view of the spool upon which the coils are wound.

Figure 7 is a view at right angles to Figure 6 and partly in section.

Figure 8 shows a perspective view of an alternative mounting for the armature.

Figure 9 is a sectional view of the same showing the armature in position.

Figure 10 is a bottom plan view of an alternative form of construction embodying only one coil.

Figure 1:
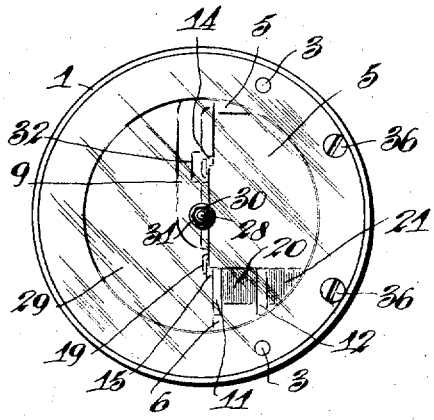
Figure 1 is a face view of the receiver with the cover or cap removed.
Figure 2:
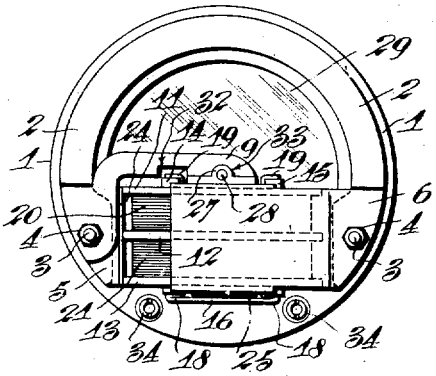
Figure 2 is a bottom plan view of the receiver removed from the usual inclosing case.
Figure 3:
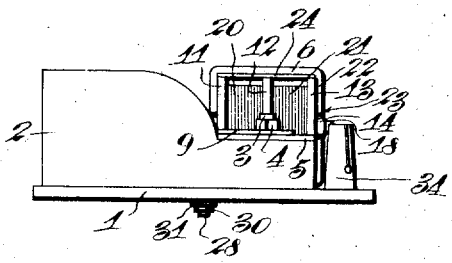
Figure 3 is a side elevation.
Figure 4:
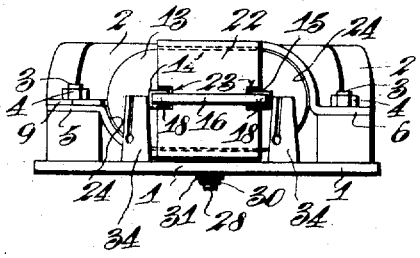
Figure 4 is an elevation taken at right angles to Figure 3.

To a ring 1 of suitable material is secured a permanent magnet 2 of the general form shown in Figure 5. Bolts 3 pass through the ring and magnet and are provided with nuts 4 for securing the parts together. Two pole pieces 5 and 6 are provided with holes 7 and 8 respectively through which pass the bolts 3. A tuning spring or member 9 is provided with a hole 10 through which passes one of the bolts 3. It will be seen therefore that the two bolts 3 with their nuts 4 hold in position substantially all of the parts of the receiver.

Three pieces of fibre 11, 12 and 13 of general elliptical shape each have an oblong opening extending through the same, the edges of which openings are enlarged and provided with wooden pins 14 and 15. The fibre pieces 11, 12 and 13 and the pins 14 and 15 on which they are fitted constitute a spool or bobbin for the coil or coils. A thin strip of suitable metal 16 lies along the inner sides of the wooden pins and is folded upon itself at 18 to overlap the outer ends of the pins, while at the inner ends, the ends of the strips are bent over as shown at 19. The three fibre strips provide for two coils, one coil 20 lying between the strips 11 and 12, and the other coil 21 lying between the strips 12 and 13. These coils are wound in opposite directions, see Figure 11. The use of a spool of this type obviates the necessity for other insulation, and produces a light and cheap construction, which nevertheless is very efficient. The pins 14 and 15 and strips 16 constitute a holder for the fibre pieces 11, 12 and 13 and serve as a carrier for the armature.

It should also be noted that it is preferable to shape the backs $5^x$—$6^x$ of the pole pieces 5 and 6 to conform to the shape of the coils, not only to aid in preventing displacement of the spool or bobbin but also to increase the efficiency of the device by giving a strong pull to the armature.

The pole piece 6 has sides bent at substantially right angles to form parts 22 that extend on the sides of the spool. Notches 23 are cut out of each part 22 and in these engage the wooden pins 14 and 15 when the parts are assembled. The pole piece 7 is similarly formed. The side pieces of the pole piece 6 do not quite contact with the similar parts of the pole piece 7 but space is left between them for the armature. Pieces of mica one of which is shown in Figure 5 at 24 lie between the pole pieces and the coils.

The armature 25 has projections 26 at its sides near the middle which engage openings or depressions formed in the metal strip 16 near the middle of the spool, thus pivoting the armature to move freely. A projection 27 at the inner end of the armature is connected by a bolt 28 to the diaphragm 29, a nut 30 and washer 31 being employed to hold the bolt and diaphragm in engagement.

By pivoting the armature directly to the spool or bobbin, i. e. to the armature carrier 14, 15 and 16 in the manner described, danger of electrical contact being produced between the armature and coil windings adjacent thereto is reduced to the minimum.

The tuning spring 9 carried at one end by the bolt 3 has a cut out 32 that fits about the wooden pin 15 and another cut out 33 adjacent the bolt 28, and the inner end of this spring member 9 is engaged by the diaphragm. Accidental and unintended movements of the diaphragm are thus prevented.

Split binding posts 34 are provided for the leading in wires. These are held in place by screws 36 as indicated in Figure 1 which pass through the ring 1. All of the above parts may be included in a suitable case of any desired type which will be provided with apertures for the leading in wires.

Figure 11:
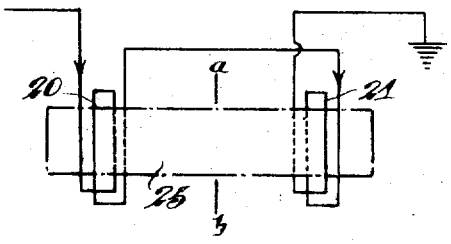
Figure 11 is a diagrammatic view of the winding of the two coils and their relation to the armature.

The diagrammatic view of Figure 11 shows how the armature which is pivoted on the line *a—b* is subjected to the tuning influence of the two coils which are wound in opposite directions but so that their influence is on the same face of the armature. In this manner the receiver is rendered more sensitive.

Figure 10 discloses a modification in which a single coil 37 may be employed instead of the two coils shown in the first form. In this form two fibre pieces 11 and 13 only are necessary. Otherwise, the two embodiments of my invention are substantially the same.

Figures 8 and 9 disclose an alternative manner of pivoting the armature. In this form the central fibre member 12′ is provided with an enlarged central aperture 38. In one side of the disc is inserted a metal member 39 and a similar metal piece 40 (with a lip 41 serving as engaging means for movement) is slidably mounted in a passageway in the disc. The member 39 has projections 42 at its corners, and the member 40 has similar projections 43 at its corners which come into contact with the projections 42 when the member 40 is inserted into position. The armature 25′ has notches in its edges into which fit the projections when the member 40 is pushed into contact with the member 39. This provides a freely moving pivotal support for the armature.

It is obvious that other means may be provided for pivoting the armature. Also size, proportion and form may be varied without in any way departing from the spirit of my invention which is to be regarded as limited only by the scope of the appended claims.

I claim as my invention:

1. A telephone receiver comprising a ring member, a U-shaped permanent magnet carried by said member, pole pieces attached to the ends of the magnet and extending toward each other, a spool retained in position by said pole pieces, two oppositely wound coils on said spool, an opening through the center of said spool, an armature pivoted to the spool within said opening, a diaphragm carried by the ring member, and means connecting one end of the armature to the diaphragm.

2. A telephone receiver comprising a ring member, a permanent magnet carried by said member and having free ends, pole pieces attached to the ends of the magnet and having free ends which are U-shaped, a spool supported between the free ends of the pole pieces, oppositely wound coils on said spool, an opening through the center of the spool, an armature pivoted to the spool in said opening, a diaphragm, and means connecting the armature to the diaphragm.

3. A telephone receiver comprising a ring member, a U-shaped permanent magnet carried by said member and having free ends, pole pieces attached to the ends of the magnet and having free ends that are U-shaped, a spool supported between the free ends of the pole pieces, a coil on said spool, said pole pieces having their backs shaped to conform to the shape of the coils and the spool edges in contact with said pole pieces, an armature pivotally supported directly by said spool, a diaphragm, and means connecting the armature to the diaphragm.

4. A telephone receiver comprising a ring member, a permanent magnet carried thereby, pole pieces attached to said magnet and having free ends extending toward each other, a spool supported between the free ends of the pole pieces, oppositely wound coils on said spool, an armature pivotally supported directly by said spool, a diaphragm, and means connecting the armature to the diaphragm.

5. In a telephone receiver, a spool for coils comprising a plurality of fibre discs provided with central openings, wooden pins at the edges of said openings, and a metal strip arranged to substantially cover the ends and inside faces of the wooden pins.

6. In a telephone receiver, a plurality of fibre discs provided with central openings, wooden pins at the edges of said opening, a metal strip arranged at the inner faces of the wooden pins, and an armature pivotally supported by said metal strip.

7. In a telephone receiver, a spool for coils comprising fibre discs provided with central openings, spaced non-metallic members positioned within said openings, and a metal strip covering the inner faces of the non-metallic members.

8. In a telephone receiver, a supporting member for an armature comprising a fibre disc having a central opening and notches and relatively adjustable members carried by said disc and projecting into said opening and provided with projecting corners adapted to engage the notches in the armature.

9. A telephone receiver comprising a U-shaped permanent magnet, pole pieces attached to the ends of the magnet and extending toward each other, a spool retained in position by said pole pieces, oppositely wound coils on said spool, an opening through the center of said spool, an armature pivoted within said opening so that one coil overlies one part of the armature and the other coil the other part, a diaphragm, and means connecting one end of the armature to the diaphragm.

10. A telephone receiver comprising a permanent magnet having separated free ends, pole pieces attached to the ends of the magnet and having free U-shaped ends, a spool supported between the free ends of the pole pieces, oppositely wound coils on said spool, an opening through the center of the spool, an armature pivoted in said opening so that one coil overlies one part of the armature and the other coil the other part, a diaphragm, and means connecting the armature to the diaphragm.

11. A telephone receiver comprising a ring member, a U-shaped permanent magnet carried by said member and having free ends, pole pieces attached to the ends of the magnet, said pole pieces having free ends that are U-shaped, said pole pieces having ears for mounting said pole pieces on the magnet and having connecting portions between said ears and said U-shaped free ends, a spool having flat upper and lower edge portions and curved side portions supported between the free ends of the pole pieces, said pole pieces having their backs and said connecting portions shaped to conform to the shape of the spool edges in contact with said pole pieces, a coil on said spool, an armature pivotally supported directly by said spool, a diaphragm, and means connecting the armature to the diaphragm.

12. In telephone receivers, a support, a generally U-shaped permanent magnet secured to the support and having its ends widely spaced apart, pole pieces secured at the ends of the magnet legs on the face opposite to the support, said pole pieces extending toward one another and at substantially right angles to the direction of the length of the legs of the magnet, each pole piece comprising an ear by which it is secured to the magnet, a U-shaped end and a curved portion connecting the ear with the U-shaped end, a spool with coil held between the U-shaped ends of the pole pieces, said pole pieces having their curved portions shaped to conform to the adjacent outline of the spool, said spool having a central opening and an armature pivotally mounted to the spool within said opening, a diaphragm carried by the base and a rod connecting the diaphragm to the armature.

13. In telephone receivers, a support, a generally U-shaped permanent magnet secured to the support and having its ends widely spaced apart, pole pieces secured at the ends of the magnet legs on the face opposite to the support, said pole pieces extending toward one another and at substantially right angles to the direction of the length of the legs of the magnet, each pole piece comprising an ear by which it is secured to the magnet, a U-shaped end and a curved portion connecting the ear with the U-shaped end, a spool with coil held between the U-shaped ends of the pole pieces, said pole pieces having their curved portions shaped to conform to the adjacent outline of the spool, said spool having a central opening and an armature pivotally mounted to the spool within said opening, a diaphragm carried by the base and a rod connecting the diaphragm to the armature, said ears lying in substantially the same plane and in substantial alignment with said central bearing.

14. In telephone receivers, a support, a generally U-shaped permanent magnet secured to the support and having its ends widely spaced apart, pole pieces secured at the ends of the magnet legs on the face opposite to the support, said pole pieces extending toward one another and at substantially right angles to the direction of the length of the legs of the magnet, each pole piece comprising an ear by which it is secured to the magnet, a U-shaped end and a curved portion connecting the ear with the U-shaped end, a spool with coil held between the U-shaped ends of the pole pieces, said pole pieces having their curved portions shaped to conform to the adjacent outline of the spool, said spool having a central opening and an armature pivotally mounted to the spool within said opening, a diaphragm carried by the base and a rod connecting the diaphragm to the armature, said spool comprising a central structure constituting an armature carrier and side pieces mounted on said central structure, said armature being pivoted in and to said central structure.

15. In telephone receivers, a support, a generally U-shaped permanent magnet secured to the support and having its ends widely spaced apart, pole pieces secured at the ends of the magnet legs on the face opposite to the support, said pole pieces extending toward one another and at substantially right angles to the direction of the length of the legs of the magnet, each pole piece comprising an ear by which it is secured to the magnet, a U-shaped end and a curved portion connecting the ear with the U-shaped end, a spool with coil held between the U-shaped ends of the pole pieces, and said pole pieces having their curved portions shaped to conform to the adjacent outline of the spool, said spool having a central opening and an armature pivotally mounted to the spool within said opening, a diaphragm carried by the base and a rod connecting the diaphragm to the armature, said spool comprising a central structure constituting an armature carrier and side pieces mounted on said central structure, said armature being pivoted in and to said central structure.

ALBERT PIHL.